(12) United States Patent
Chung et al.

(10) Patent No.: US 7,551,348 B2
(45) Date of Patent: Jun. 23, 2009

(54) TELLURITE GLASS COMPOSITE, OPTICAL WAVEGUIDE AND OPTICAL AMPLIFIER USING THE SAME

(75) Inventors: Woon Jin Chung, Daejeon (KR); Bong Je Park, Daejeon (KR); Hong Seok Seo, Daejeon (KR); Joon Tae Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/298,088

(22) Filed: Dec. 8, 2005

(65) Prior Publication Data

US 2007/0002431 A1 Jan. 4, 2007

(30) Foreign Application Priority Data

Jun. 30, 2005 (KR) .................. 10-2005-0058651

(51) Int. Cl.
*H04B 10/17* (2006.01)
*C03C 3/12* (2006.01)

(52) U.S. Cl. .................. 359/341.5; 501/41; 359/334
(58) Field of Classification Search ............. 359/341.5; 501/41
See application file for complete search history.

(56) References Cited

U.S. PATENT DOCUMENTS

| | | | | |
|---|---|---|---|---|
| 3,291,620 A | * | 12/1966 | Evstropjev et al. ............ | 501/41 |
| 3,423,326 A | * | 1/1969 | Redman ................ | 252/301.6 S |
| 3,661,600 A | * | 5/1972 | Izumitani et al. .............. | 501/41 |
| 3,690,908 A | * | 9/1972 | Greco et al. .................. | 501/42 |
| 3,836,871 A | * | 9/1974 | Cooley ........................ | 501/41 |
| 3,845,406 A | * | 10/1974 | Cooley ........................ | 372/40 |
| 3,845,407 A | * | 10/1974 | Cooley ........................ | 372/40 |
| 3,845,408 A | * | 10/1974 | Cooley ........................ | 372/40 |
| 3,849,739 A | * | 11/1974 | Cooley ........................ | 372/40 |
| 3,855,545 A | * | 12/1974 | Cooley ........................ | 372/40 |
| 3,883,357 A | * | 5/1975 | Cooley ........................ | 501/41 |
| 4,312,660 A | * | 1/1982 | Blair et al. .................... | 65/85 |
| 4,407,061 A | * | 10/1983 | Grodkiewicz et al. ......... | 438/38 |
| 4,652,536 A | * | 3/1987 | Nakajima et al. ............. | 501/41 |
| 4,719,186 A | * | 1/1988 | Mennemann et al. ......... | 501/67 |

(Continued)

FOREIGN PATENT DOCUMENTS

KR 2001-0036623 5/2001

(Continued)

OTHER PUBLICATIONS

Mori, A et al, "Ultra-wideband Tellurite-based Raman fibre amplifier," Electronics Letters, Nov. 22, 2001, vol. 37, No. 24, pp. 1442-1443.

*Primary Examiner*—Eric Bolda
*Assistant Examiner*—Ari M Diacou
(74) *Attorney, Agent, or Firm*—Ladas & Parry LLP

(57) ABSTRACT

Provided are a tellurite glass composite, an optical waveguide, and an optical amplifier using the tellurite glass composite. The tellurite glass composite includes an entire composite including 25 (mol %)$\leq TeO_2 \leq$90 (mol %), 1 (mol %)$\leq T_1O_3 \leq$55 (mol %) or 1 (mol %)$\leq T_2O_3 \leq$40 (mol %), 0 (mol %)$\leq ZnO \leq$35 (mol %), 0 (mol %)$\leq M_2O \leq$35 (mol %), and 0 (mol %)$\leq Bi_2O_3 \leq$20 (mol %). Here, $T_1$ includes a transition metal Mo, $T_2$ includes a transition metal W, $M_2O$ includes $Li_2O$, $Na_2O$, or two or more of $Li_2O$, $Na_2O$, $K_2O$, $Rb_2O$, and $Cs_2O$ including metals having +1 valence electrons, and amounts of $M_2O$ and ZnO are not simultaneously "0".

18 Claims, 4 Drawing Sheets

U.S. PATENT DOCUMENTS

| | | | |
|---|---|---|---|
| 4,732,875 A * | 3/1988 | Sagara | 501/42 |
| 4,945,071 A * | 7/1990 | Friesen et al. | 501/41 |
| 5,110,768 A * | 5/1992 | Kaner et al. | 501/1 |
| 5,196,383 A * | 3/1993 | Ito et al. | 501/12 |
| 5,251,062 A | 10/1993 | Snitzer et al. | |
| 5,283,211 A * | 2/1994 | Aitken et al. | 501/41 |
| 6,194,334 B1 * | 2/2001 | Aitken et al. | 501/41 |
| 6,352,950 B1 * | 3/2002 | Aitken et al. | 501/37 |
| 6,356,387 B1 * | 3/2002 | Ohishi et al. | 359/341.5 |
| 6,376,399 B1 * | 4/2002 | Aitken et al. | 501/41 |
| 6,599,853 B2 * | 7/2003 | Sugimoto et al. | 501/50 |
| 6,656,859 B2 * | 12/2003 | Aitken et al. | 501/41 |
| 6,771,414 B2 * | 8/2004 | Masuda et al. | 359/341.1 |
| 6,821,917 B2 * | 11/2004 | Taylor et al. | 501/41 |
| 7,033,966 B2 * | 4/2006 | Kobayashi et al. | 501/41 |
| 2001/0044369 A1 * | 11/2001 | Sugimoto et al. | 501/50 |
| 2002/0080474 A1 * | 6/2002 | Ohishi et al. | 359/341.5 |
| 2002/0082156 A1 * | 6/2002 | Aitken et al. | 501/41 |
| 2002/0167717 A1 | 11/2002 | Masuda et al. | |
| 2003/0045421 A1 * | 3/2003 | Burger et al. | 501/41 |
| 2004/0101269 A1 * | 5/2004 | Jiang et al. | 385/142 |
| 2004/0235634 A1 * | 11/2004 | Kobayashi et al. | 501/41 |
| 2006/0033983 A1 * | 2/2006 | Dai et al. | 359/334 |
| 2007/0002431 A1 * | 1/2007 | Chung et al. | 359/341.5 |
| 2007/0274665 A1 * | 11/2007 | Barbosa et al. | 385/142 |

FOREIGN PATENT DOCUMENTS

| | | |
|---|---|---|
| WO | WO 0127047 | 4/2001 |
| WO | WO 2004 015828 | 2/2004 |

\* cited by examiner

TELLURITE GLASS COMPOSITE, OPTICAL WAVEGUIDE AND OPTICAL AMPLIFIER USING THE SAME

CROSS-REFERENCE TO RELATED PATENT APPLICATION

This application claims the benefit of Korean Patent Application No. 10-2005-0058651, filed on Jun. 30, 2005, in the Korean Intellectual Property Office, the disclosure of which is incorporated herein in its entirety by reference.

BACKGROUND OF THE INVENTION

1. Field of the Invention

The present invention relates to a tellurite glass composite and an optical waveguide and an optical amplifier using the same.

2. Description of the Related Art

In general, optical amplifiers, for example optical fiber amplifiers, have been developed focusing on C band, i.e., wavelength between 1530 nm and 1565 nm based on an erbium-doped fiber amplifier (EDFA). However, studies on Raman optical fiber amplifiers useable in various bands have been briskly made as the ultrahigh, large capacity optical communication system highly demands broad useable optical communication bands through the optical fiber. In particular, the Raman optical fiber amplifiers have been extensively investigated as a key player of the broad-band optical communications employing wavelength multiplexing optical communication systems with the recent development of high power semiconductor laser diodes and silica optical fibers having improved Raman gain coefficients.

However, normal silica optical fiber-based Raman optical fiber amplifiers have low gain coefficients and require at least several kilometers (Km) of fiber. Thus, high power pumping sources are required. Also, signal-to-noise ratios (SNRs) of optical fiber amplifiers are low due to a near distance of about 100 nm between a pumping source wavelength and a signal wavelength.

Thus, tellurite glass optical fiber-based Raman optical fiber amplifiers have been suggested. A tellurite glass generates two Raman scattering peaks respectively existing at a wave number of about 450 cm$^{-1}$ and 700 cm$^{-1}$. The Raman scattering peak of 700 cm$^{-1}$ is 170 nm distant from the pumping source. Thus, when the tellurite glass uses multi-wavelength pumping, the tellurite glass is more advantageous to amplify a wide band and improve an SNR than silica glass.

Also, the tellurite glass has a high non-linearity and thus has a high Raman gain coefficient which is about 16 times higher than that of the silica glass. Thus, the tellurite glass can amplify signals through an optical fiber having a relatively short length. As a result, an optical fiber amplifier of about 160 nm reaching from S band to L band has been realized using a tellurite optical fiber of about 250 m and four or more pumping sources.

However, since Raman scattering has a full-width at half maximum (FWHM) of less than about 200 cm$^-$ centered at 700 cm$^{-1}$, an existing tellurite glass optical fiber-based Raman amplifier has its drawbacks requiring a plurality of pumping sources for wide-band operation.

SUMMARY OF THE INVENTION

The present invention provides a tellurite glass composite increasing a FWHM of Raman scattering so as to realize a wideband Raman amplifier or a laser using a small number of excitation sources.

The present invention also provides an optical waveguide using the tellurite glass composite as a core layer.

The present invention also provides a wideband optical amplifier using an optical fiber or an optical waveguide using the tellurite glass composite as a core layer or a gain medium.

According to an aspect of the present invention, there is provided a tellurite glass composite including an entire composite including 25 (mol %)$\leq$TeO$_2\leq$90 (mol %), 1 (mol %)$\leq$T$_1$O$_3\leq$55 (mol %) or 1 (mol %)$\leq$T$_2$O$_3\leq$40 (mol %), 0 (mol %)$\leq$ZnO$\leq$35 (mol %), 0(mol %)$\leq$M$_2$O$\leq$35 (mol %), and 0 (mol %)$\leq$Bi$_2$O$_3\leq$20 (mol %). Here, T$_1$ may include a transition metal Mo, T$_2$ may include a transition metal W, M$_2$O may include Li$_2$O, Na$_2$O, or two or more of Li$_2$O, Na$_2$O, K$_2$O, Rb$_2$O, and Cs$_2$O including metals having +1 valence electrons, and amounts of M$_2$O and ZnO may not simultaneously be "0."

The tellurite glass composite may be used as a core layer of an optical fiber or an optical waveguide.

The tellurite glass composite may be used as a core layer of an optical fiber or an optical waveguide so as to constitute the optical fiber or the optical waveguide. Also, an optical amplifier or a laser using an optical fiber or an optical waveguide formed of the tellurite glass composite as a gain medium may be constituted. The optical amplifier or the laser may use pump sources having one or two or more wavelengths between 1150 nm and 1500 nm.

The tellurite glass composite may include a molybdenum oxide or a tungsten oxide to increase a FWHM of Raman scattering to about 300 cm$^{-1}$ or more centered at about 700~800 cm$^{-1}$ so as to perform wideband amplification using a small number of light sources.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
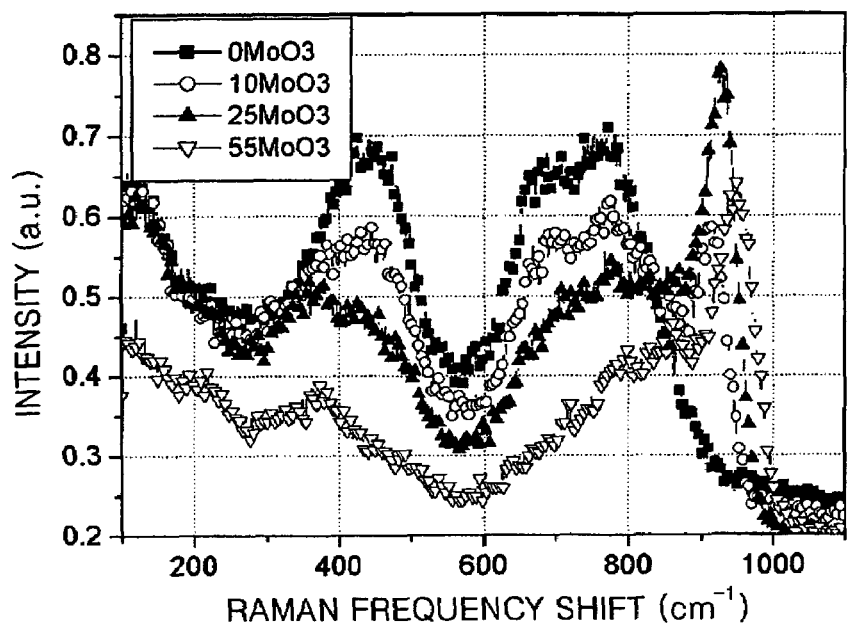
FIG. 1 is a graph illustrating a Raman scattering spectrum of a tellurite glass composite including a molybdenum oxide according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

A tellurite glass composite will now be described. The tellurite glass composite includes $TeO_2$, ZnO, $Na_2O$ (or $Li_2O$), and a plurality of oxide-doped composites. The tellurite glass composite may be formed of a two-component composite such as $TeO_2$—ZnO and $TeO_2$—PbO but is mainly formed of a multi-component composite. $TeO_2$ exists as various structures such as $TeO_4$, $TeO_3$, and $TeO_{3+\delta}$ inside the tellurite glass composite and forms a network of the tellurite glass composite, and ZnO and $Na_2O$ (or $Li_2O$) exist as modifiers changing structures inside of the tellurite glass composite or as charge compensators inside the tellurite glass composite.

As previously described, the tellurite glass composite shows two wide and strong Raman scattering peaks. In other words, the tellurite glass composite includes a peak of about 450 $cm^{-1}$ corresponding to the Te—O—Te bending vibration mode and a peak of about 700 $cm^{-1}$ which can be assigned to the vibration mode from network forming structural units such as $TeO_4$, $TeO_3$ and $TeO_{3+\delta}$. A FWHM of the peak of about 700 $cm^{-1}$ is about 200 $cm^{-1}$ in normal tellurite glasses and an additional Raman scattering peak is required to increase the FWHM.

Thus, the present inventors added a transition metal oxide, for example a molybdenum oxide ($MoO_3$) and a tungsten oxide ($WO_3$), to a general tellurite glass composite to increase the FWHM. Transition metal oxides such as the molybdenum and tungsten oxides have structures with strong Raman scatterings at about 900 $cm^{-1}$. Thus, the FWHM could be increased if the transition metal oxides are incorporated. Also, composites of the transition metal oxides may be adjusted to obtain a flattened Raman scattering spectrum from which a flattened signal gain could be expected.

Based on this, the present inventors have invented a tellurite glass composite optimal to flatten a Raman scattering peak of 700 $cm^{-1}$ through various experiments.

A tellurite glass composite according to an embodiment of the present invention includes an entire composite including 25 (mol %)$\leq TeO_2 \leq$90 (mol %), 1 (mol %)$\leq MoO_3 \leq$55 (mol %), 0 (mol %)$\leq ZnO \leq$35 (mol %), 0 (mol %)$\leq M_2O \leq$35 (mol %), and 0 (mol %)$\leq Bi_2O_3 \leq$20 (mol %). $M_2O$ is $Li_2O$ or $Na_2O$ and includes two or more of metal oxides including metals having valence electrons of +1 such as $Li_2O$, $Na_2O$, $K_2O$, $Rb_2O$, or $Cs_2O$. For example, $M_2O$ may include both of $Li_2O$ and $Na_2O$ to satisfy the composite range. Dosages of the $M_2O$ and ZnO must not be "0" at the same time.

One or two or more of $MoO_3$, $WO_3$, $Ta_2O_5$, PbO, $Nb_2O_3$ and $Al_2O_3$ may be added as a first additive to the entire composite constituting the tellurite glass composite by amount of between 0 mol % and 20 mol %. Also, a composite of oxides or fluorides except $WO_3$, $Ta_2O_5$, PbO, $Nb_2O_3$, and $Al_2O_3$ may be added as a second additive to the entire composite by an amount between 0 mol % and 40 mol %, the rare-earth oxides or the rare-earth fluorides being not suggested to constitute the tellurite glass composite.

In other words, a composite of an oxide excluding Te, Mo, W, Zn, M, or Bi constituting the tellurite glass composite, an oxide excluding Ta, Pb, Nb, or Al, and fluorides may be added as the second additive to the entire composite by the amount between 0 mol % and 40 mol %, the oxides and the fluorides excluding rare-earth oxides and rare-earth fluorides. The fluorides are metal fluorides including metals constituting the tellurite glass composite.

One or two or more of rare-earth oxides including $Pr_2O_3$, $Nd_2O_3$, $Sm_2O_3$, $Eu_2O_3$, $Tb_2O_3$, $Dy_2O_3$, $Ho_2O_3$, $Er_2O_3$, $Tm_2O_3$, or $Yb_2O_3$ or fluorides including $PrF_3$, $NdF_3$, $SmF_3$, $EuF_3$, $TbF_3$, $DyF_3$, $HoF_3$, $ErF_3$, $TmF_3$, and $YbF_3$ may be added as a third additive to the entire composite constituting the tellurite glass composite by an amount between 0 mol % and 5 mol %. All of the first, second, and third additives may be added or only one of the first, second, and third additives may be added.

According to another embodiment of the present invention, a tellurite glass composite according to another embodiment of the present invention includes an entire composite including 25 (mol %)$\leq TeO_2 \leq$90 (mol %), 1 (mol %)$\leq WO_3 \leq$40 (mol %), 0 (mol %)$\leq ZnO \leq$35 (mol %), 0 (mol %)$\leq M_2O \leq$35 (mol %), and 0 (mol %)$\leq Bi_2O_3 \leq$20 (mol %). $M_2O$ is $Li_2O$ or $Na_2O$ or includes two or more metal oxides of metal oxides including metals having valence electrons of +1 such as $Li_2O$, $Na_2O$, $K_2O$, $Rb_2O$, or $Cs_2O$. For example, $M_2O$ may include all of $Li_2O$ and $Na_2O$ to satisfy the composite range. Dosages of $M_2O$ and ZnO must not be "0" at the same time.

One or two or more of $MoO_3$, $Ta_2O_5$, PbO, $Nb_2O_3$ and $Al_2O_3$ may be added as a first additive to an entire composite constituting the tellurite glass composite by an amount between 0 mol % and 20 mol %. Also, a composite of oxides or fluorides except $MoO_3$, $Ta_2O_5$, PbO, $Nb_2O_3$, and $Al_2O_3$ may be added as a second additive to the entire composite by an amount between 0 mol % and 40 mol %, the rare-earth oxides or the rare-earth fluorides being not suggested to constitute the tellurite glass composite.

In other words, a composite of an oxide excluding Te, W, Mo, Zn, M, or Bi constituting the tellurite glass composite, an oxide excluding Ta, Pb, Nb, or Al, and fluorides may be added as the second additive to the entire composite by the amount between 0 mol % and 40 mol %, the oxides and the fluorides excluding rare-earth oxides and rare-earth fluorides. The fluorides are metal fluorides including metals constituting the tellurite glass composite.

One or two or more of rare-earth oxides including $Pr_2O_3$, $Nd_2O_3$, $Sm_2O_3$, $Eu_2O_3$, $Tb_2O_3$, $Dy_2O_3$, $Ho_2O_3$, $Er_2O_3$, $Tm_2O_3$, or $Yb_2O_3$, or fluorides including $PrF_3$, $NdF_3$, $SmF_3$, $EuF_3$, $TbF_3$, $DyF_3$, $HoF_3$, $ErF_3$, $TmF_3$, and $YbF_3$ may be added as a third additive to the entire composite constituting the tellurite glass composite by an amount between 0 mol % and 5 mol %. All of the first, second, and third additives may be added or only one of the first, second, and third additives may be added.

A Raman scattering spectrum of a tellurite glass composite including a molybdenum oxide and a tungsten oxide will now be described. A tellurite glass composite adopted in the present invention representatively uses a composite of the above-described composites of the present invention that will be described later.

FIG. 1 is a graph illustrating a Raman scattering spectrum of a tellurite glass composite including a molybdenum oxide according to an embodiment of the present invention.

In detail, the tellurite glass composite shown in FIG. 1 is a representative composite using (85−x) $TeO_2$+10 ZnO+5 $Na_2O$+x $MoO_3$. Variations in Raman scattering were observed with an increase in a content of the molybdenum oxide ($MoO_3$). Here, "x" was changed into "0, 10, 25, and 55" and added to the maximum concentration enough to manufacture the tellurite glass composite.

As shown in FIG. 1, a tellurite glass composite not including a molybdenum oxide shows typical Raman scattering which can be observed in a general tellurite glass composite. As the molybdenum oxide is added, a characteristic Raman peak is grown at about 900 cm$^{-1}$ due to the molybdenum oxide.

As shown in FIG. 1, a Raman scattering width of the tellurite glass composite is increased by strong Raman scattering of the molybdenum oxide at about 900 cm$^{-1}$ with the increase in an amount of the molybdenum oxide. If the molybdenum oxide is added by about 25 mol %, a maximum FWHM is increased. In other words, a tellurite glass composite including a molybdenum oxide of about 25 mol % shows wide Raman scattering of about 800 cm$^{-1}$ having a FWHM of about 310 cm$^{-1}$.

A Raman scattering peak of about 700 cm$^{311}$ generated by TeO$_4$, TeO$_3$, and combinations of TeO$_4$ and TeO$_3$ gradually moves to about 800 cm$^{-1}$. This movement shows due to a gradual change of TeO$_4$ inside the tellurite glass composite into TeO$_3$ or TeO$_{3+\delta}$ due to the addition of the molybdenum oxide.

Figure 2:
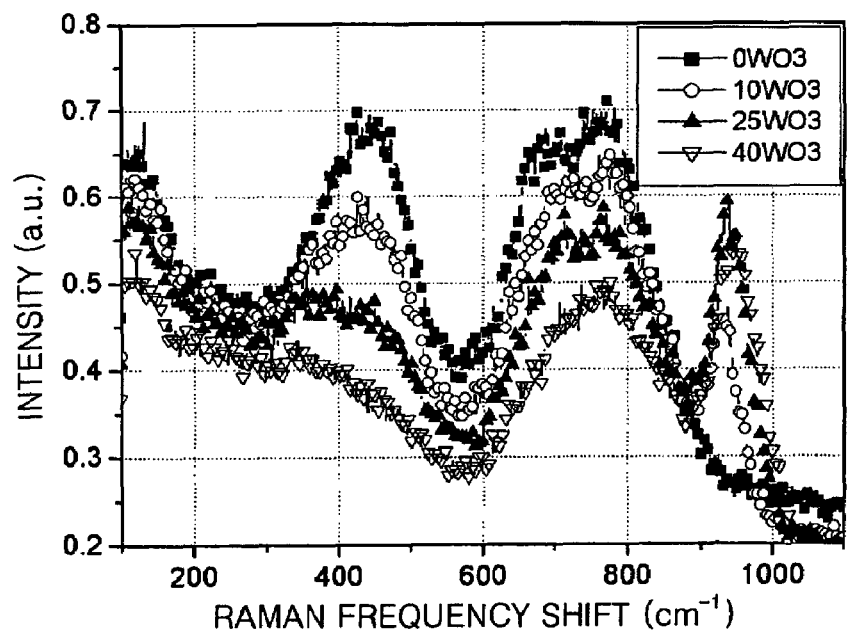
FIG. 2 is a graph illustrating a Raman scattering spectrum of a tellurite glass composite including a tungsten oxide according to an embodiment of the present invention.

FIG. 2 is a graph illustrating a Raman scattering spectrum of a tellurite glass composite including a tungsten oxide according to an embodiment of the present invention.

In detail, the telluriate glass composite shown in FIG. 2 is a representative composite using (85−x) TeO2+10 ZnO+5 Na2O+x WO3. A content of the tungsten oxide was increased to observe variations in Raman scattering. "x" is changed into "0," "10," "25," and "40" and added to a section enough to manufacture the tellurite glass composite.

As shown in FIG. 2, as the tungsten oxide is added, a general Raman peak of about 950 cm$^{-1}$ generated by the tungsten oxide is grown. In a Raman scattering spectrum of the tellurite glass composite including the tungsten oxide, a Raman scattering width of the tellurite glass composite is increased by strong Raman scattering of the tungsten oxide at about 950 cm$^{-1}$ with the increase in the tungsten oxide.

Figure 3:
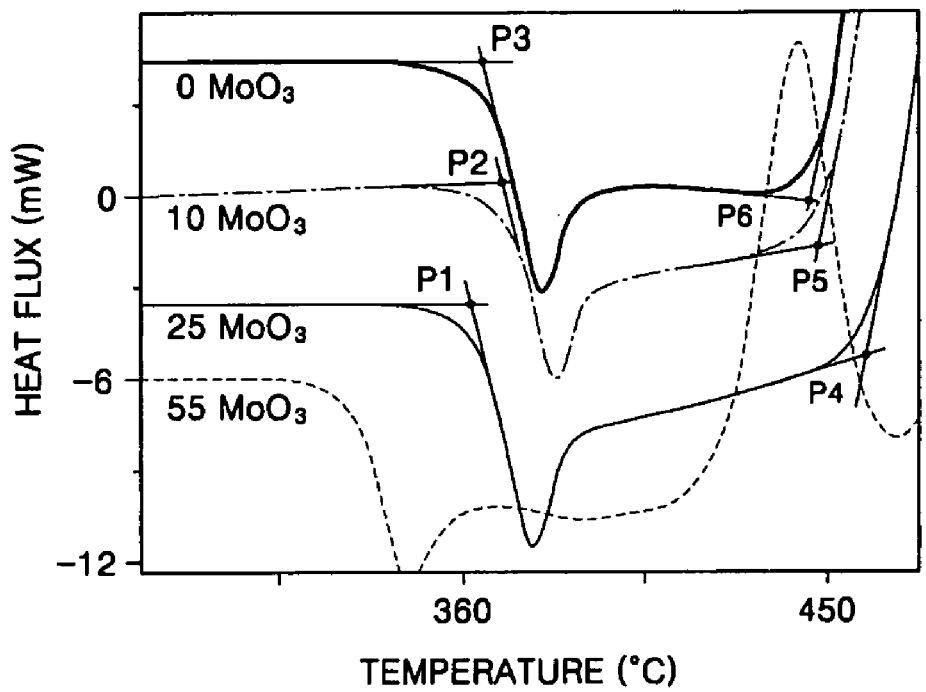
FIG. 3 is a graph illustrating results of analyzing a tellurite glass composite including a molybdenum oxide using a differential scanning calorimeter (DSC) according to an embodiment of the present invention.

FIG. 3 is a graph illustrating results of analyzing a tellurite glass composite with a molybdenum oxide using a DSC according to an embodiment of the present invention.

In detail, FIG. 3 is a graph illustrating the results of an experiment performed with respect to the representative composite shown in FIG. 1. Referring to FIG. 3, P1, P2, and P3 denote first transition points having X-axis values indicating glass transition temperatures, and P4, P5, and P6 denote secondary transition points having X-axis values indicating crystallization temperatures.

As shown in FIG. 3, a gap between a glass transition temperature and a crystallization temperature determining the stability of the tellurite glass composite is gradually increased with an increase in an amount of the molybdenum oxide. In particular, a gap between a crystallization temperature and a glass transition temperature of the tellurite glass composite including a molybdenum oxide of 25 mol % is about 100° C. enabling a relatively stable drawing of an optical fiber.

The above-described tellurite glass composite of the present invention may be used as a core layer of an optical fiber or an optical waveguide. In other words, if the tellurite glass composite of the present invention is used as a core layer, the tellurite glass composite may have Raman gain coefficient 16 times higher than that of the general silica glass composite and thus may be used as a core layer of an optical fiber or waveguide having a relatively short length.

In particular, as previously described, a FWHM of a Raman scattering peak of 700 cm$^{-1}$ can be increased in an optical fiber or waveguide using the tellurite glass composite of the present invention. Thus, a wideband optical amplifier or laser can be realized using a small number of excitation sources. Hereinafter, an optical amplifier using the tellurite glass composite of the present invention as a core layer of an optical fiber will now be described representatively.

Figure 4:
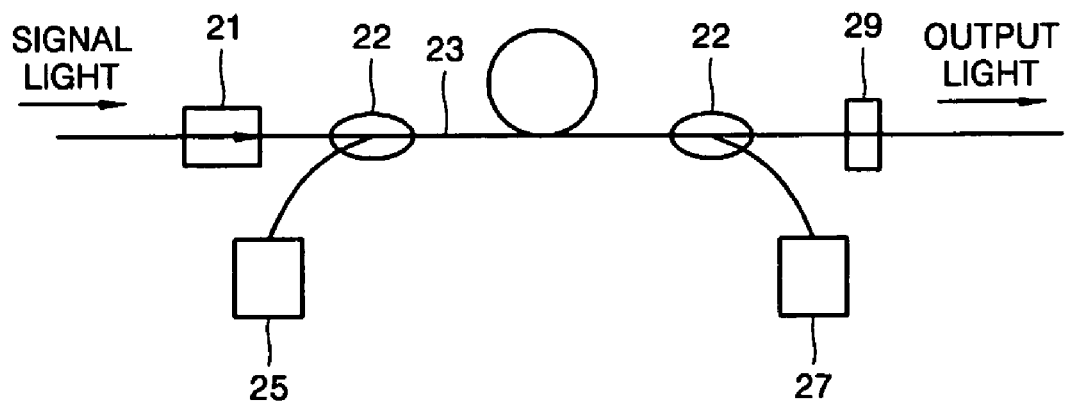
FIG. 4 is a view illustrating an optical amplifier using an optical fiber formed of a tellurite glass composite of the present as a gain medium.
Figure 5:
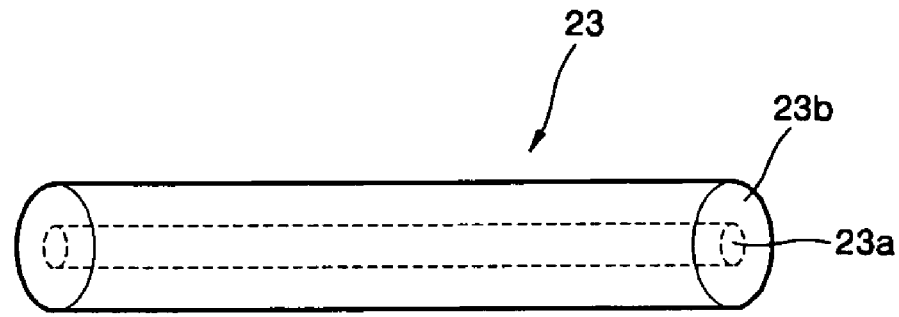
FIG. 5 is a perspective view illustrating an optical fiber according to an embodiment of the present invention.

FIG. 4 is a view illustrating an optical amplifier using an optical fiber formed of the tellurite glass composite of the present invention using a gain medium, and FIG. 5 is a perspective view of an optical fiber according to an embodiment of the present invention.

In detail, an optical fiber 23 formed of the tellurite glass composite of the present invention is used as a gain medium and first and second excitation sources (first and second pump sources) 25 and 27 are used so as to realize an optical amplifier. Wavelengths of the first and second excitation sources 25 and 27 may be selected within a range between 1150 nm and 1500 nm to properly amplify a communication band.

However, as shown in FIG. 4, a Raman optical amplifier is excited bi-directionally by pump lights emitted from the first and second excitation sources 25 and 27 having the same or different wavelengths, for example, wavelengths of 1342 nm and 1407 nm. Here, a structure of the Raman optical amplifier is not limited to a structure shown in FIG. 4 but may vary depending on its use purpose and performance.

In more detail, signal light goes into the optical fiber 23 including a core layer 23a formed of the tellurite glass composite of the present invention and a clad layer 23b enclosing the core layer 23a. Here, the signal light passes through an optical isolator 21 to the optical fiber 23 for unidirectional operation.

The signal light is coupled through a WDM (wavelength division multiplexing) coupler 22 to the optical fiber 23, amplified inside the optical fiber 23 by the first excitation source (the first pump source) 25 having the wavelength of 1342 nm and the second excitation source (the second pump source) 27 having the wavelength of 1407 nm, and goes out as output light. As previously described, the tellurite glass composite may generate a strong peak at a distance of about 900 cm$^{-1}$ (at a wavelength of 200 nm) from wavelengths of an excitation light source. Thus, a gain flattening filter 29 may be installed in front of an output node to attenuate a signal in this wavelength so as to obtain a flattened gain.

The Raman optical amplifier shown in FIG. 4 may use one or more semiconductor lasers having the same or different wavelengths which pump the optical fiber 23 in forward direction using only the first excitation source 25, or pump in backward direction using only the second excitation source 27, or bi-directionally pump the fiber using the first and second, excitation sources 25 and 27. Although the optical amplifier shown in FIG. 4 employs two pumping sources, more pumping sources may also be coupled to the optical fiber 23 in forward or backward direction.

The optical amplifier using the optical fiber 23 has been described with reference to FIGS. 4 and 5, and an optical fiber using an optical waveguide will be omitted for convenience. This is because the optical waveguide also includes a core layer and a clad layer formed around the core layer like the optical fiber.

Figure 6:
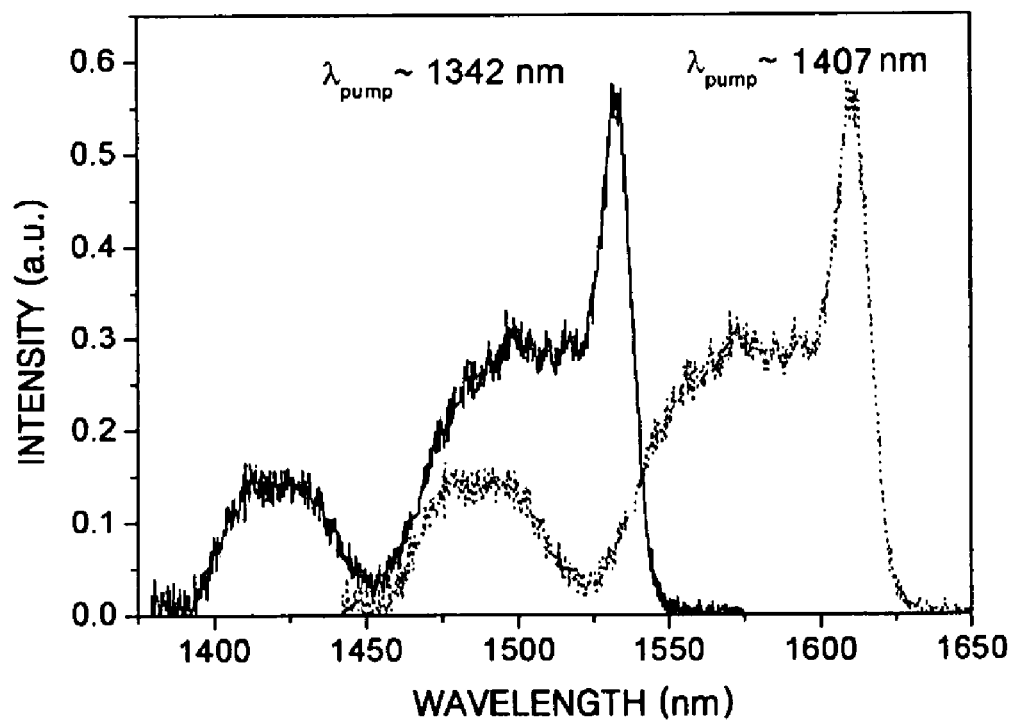
FIG. 6 is a graph illustrating Raman scattering spectra of a tellurite glass composite which is redrawn from FIG. 4 in a wavelength region assuming they are excited by two excitation sources.

FIG. 6 is a graph illustrating Raman scattering spectra of a tellurite glass composite which is redrawn from FIG. 4 in a wavelength region assuming they are excited by two excitation sources.

In detail, as shown in FIG. 6, if a wavelength of an excitation source (a pump source) is 1342 nm, a strong peak can be obtained in wavelengths of 1425 nm, 1500 nm, and 1525 nm. If the wavelength of the excitation source is 1407 nm, the strong peak can be obtained in wavelengths of 1475 nm, 1550 nm, and 1610 nm. Also, the tellurite glass composite of the present invention can generate Raman scattering with a bandwidth of about 150 nm using two excitation sources by optimizing wavelengths of the two excitation sources. This enables a wideband optical amplifier to be realized.

Figure 7:
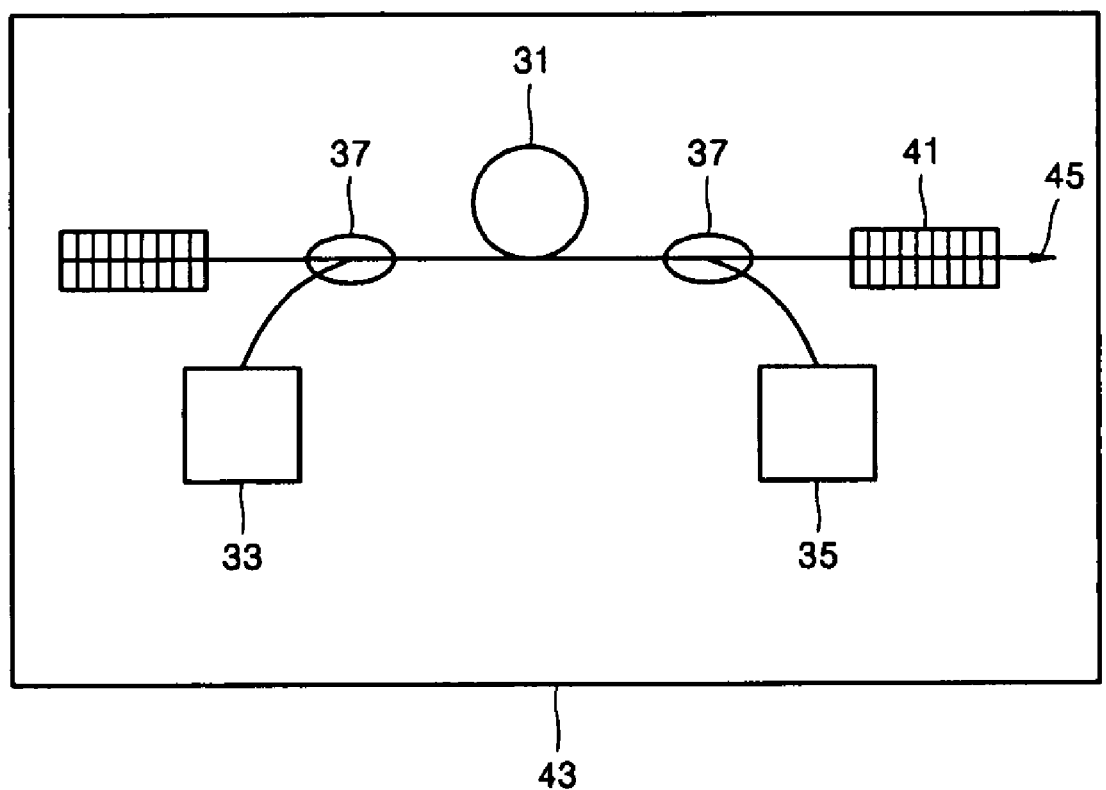
FIG. 7 is a view illustrating a laser using an optical fiber formed of a tellurite glass composite of the present invention as a gain medium.

FIG. 7 is a view illustrating a laser using an optical fiber formed of the tellurite glass composite of the present invention as a gain medium. A structure of the laser is not limited to a structure shown in FIG. 7 but may vary depending on its purpose and performance.

In detail, the laser includes an optical fiber 31 including a core layer 31a using the tellurite glass composite of the present invention and a clad layer 31b, excitation sources 33 and 35, an WDM coupler 37, a total reflection fiber bragg grating optical fiber element 39, and an output coupling fiber bragg grating optical fiber element 41. Wavelengths of the excitation sources 33 and 35 may be selected within a range between 1150 nm and 1500 nm so as to be properly amplified. The core layer 31a of the optical fiber 31 emits spontaneous Raman scattering by the excitation sources 33 and 35. The spontaneous Raman scattering is amplified between the total reflection fiber bragg grating optical fiber element 39 and the output coupling fiber bragg grating optical fiber element 41 constituting a resonator 43 so as to emit laser light 45 through the output coupling fiber bragg grating optical fiber element 41.

As described above, a tellurite glass composite of the present invention can include a transition metal oxide such as a molybdenum oxide or a tungsten oxide. A FWHM of a Raman scattering peak can be increased from about 200 cm$^{-1}$ to about 300 cm$^{-1}$ centered on about 700~800 cm$^{-1}$. Thus, the tellurite glass composite can be used in an optical fiber or waveguide used for an optical amplifier having a short length and a wide amplification band.

In addition, the optical amplifier or a laser using the tellurite glass composite of the present invention can obtain wideband optical amplification or laser oscillation using a small number of excitation sources due to the increase in the FWHM of the Raman scattering peak.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A tellurite glass composite for increasing a FWHM (full-width at half maximum) of Raman scattering peak centered at 700-800 cm$^{-1}$, comprising an entire composite comprising 25 (mol %)$\leq$TeO$_2$$\leq$90 (mol %), 1 (mol %)$\leq$T$_1$O$_3$$\leq$55 (mol %) or 1 (mol %)$\leq$T$_2$O$_3$$\leq$40 (mol %), 0 (mol %)$\leq$ZnO$\leq$35 (mol %), 0 (mol %)$\leq$M$_2$O$\leq$35 (mol %), and 0 (mol %)$\leq$Bi$_2$O$_3$$\leq$20 (mol %), wherein T$_1$ is a transition metal Mo, T$_2$ a transition metal W, M$_2$O consists of Li$_2$O, Na$_2$O, and K$_2$O, and the amounts of M$_2$O and ZnO are not simultaneously "0".

2. The tellurite glass composite of claim 1, wherein the entire composite comprises one or more of MoO$_3$, WO$_3$, Ta$_2$O$_5$, PbO, Nb$_2$O$_3$, and Al$_2$O$_3$ by an amount between 0 mol % and 20 mol %.

3. The tellurite glass composite of claim 1, wherein a composite of oxides excluding Te, Mo, W, Zn, M, or Bi, oxides excluding Ta, Pb, Nb, or Al, and fluorides is added to the entire composite by an amount between 0% and 40%, the oxides and the fluorides excluding rare-earth oxides and rare-earth fluorides.

4. The tellurite glass composite of claim 2, wherein a composite of oxides excluding Te, Mo, W, Zn, M, or Bi, oxides excluding Ta, Pb, Nb, or Al, and fluorides is added to the entire composite by an amount between 0% and 40%, the oxides and the fluorides excluding rare-earth oxides and rare-earth fluorides.

5. The tellurite glass composite of claim 1, wherein one or more of rare-earth oxides including Pr$_2$O$_3$, Nd$_2$O$_3$, Sm$_2$O$_3$, Eu$_2$O$_3$, Tb$_2$O$_3$, Dy$_2$O$_3$, Ho$_2$O$_3$, Er$_2$O$_3$, Tm$_2$O$_3$, and Yb$_2$O$_3$ or fluorides including PrF$_3$, NdF$_3$, SmF$_3$, EuF$_3$, TbF$_3$, DyF$_3$, HoF$_3$, ErF$_3$, TmF$_3$, and YbF$_3$ are added to the entire composite by an amount between 0 mol % and 5 mol %.

6. The tellurite glass composite of claim 2, wherein one or more of rare-earth oxides including Pr$_2$O$_3$, Nd$_2$O$_3$, Sm$_2$O$_3$, Eu$_2$O$_3$, Tb$_2$O$_3$, Dy$_2$O$_3$, Ho$_2$O$_3$, Er$_2$O$_3$, Tm$_2$O$_3$, and Yb$_2$O$_3$ or fluorides including PrF$_3$, NdF$_3$, SmF$_3$, EuF$_3$, TbF$_3$, DyF$_3$, HoF$_3$, ErF$_3$, TmF$_3$, and YbF$_3$ are added to the entire composite by an amount between 0 mol % and 5 mol %.

7. A tellurite glass composite for increasing a FWHM (full-width at half maximum) of a Raman scattering peak centered at 700-800 cm$^{-1}$, and used as a core layer of one of an optical fiber and an optical waveguide, comprising an entire composite comprising 25 (mol %)$\leq$TeO$_2$$\leq$90 (mol %), 1 (mol %)$\leq$T$_1$O$_3$$\leq$55 (mol %) or 1 (mol %)$\leq$T$_2$O$_3$$\leq$40 (mol %), 0 (mol %)$\leq$ZnO$\leq$35 (mol %), 0 (mol %)$\leq$M$_2$O$\leq$35 (mol %), and 0 (mol %)$\leq$Bi$_2$O$_3$$\leq$20 (mol %), wherein T$_1$ is a transition metal of Mo, T$_2$ is a transition metal of W, M$_2$O consists of Li$_2$O, Na$_2$O, and K$_2$O, and the amounts of M$_2$O and ZnO are not simultaneously "0".

8. The tellurite glass composite of claim 7, wherein the entire composite comprises one or more of MoO$_3$, WO$_3$, Ta$_2$O$_5$, PbO, Nb$_2$O$_3$, and Al$_2$O$_3$ by an amount between 0 mol % and 20 mol %.

9. The tellurite glass composite of claim 7, wherein a composite of oxides excluding Te, Mo, W, Zn, M, or Bi, oxides excluding Ta, Pb, Nb, or Al, and fluorides is added to the entire composite by an amount between 0% and 40%, the oxides and the fluorides excluding rare-earth oxides and rare-earth fluorides.

10. The tellurite glass composite of claim 7, wherein one or more of rare-earth oxides including Pr$_2$O$_3$, Nd$_2$O$_3$, Sm$_2$O$_3$, Eu$_2$O$_3$, Tb$_2$O$_3$, Dy$_2$O$_3$, Ho$_2$O$_3$, Er$_2$O$_3$, Tm$_2$O$_3$, and Yb$_2$O$_3$ or fluorides including PrF$_3$, NdF$_3$, SmF$_3$, EuF$_3$, TbF$_3$, DyF$_3$, HoF$_3$, ErF$_3$, TmF$_3$, and YbF$_3$ are added to the entire composite by an amount between 0 mol % and 5 mol %.

11. An optical waveguide using a tellurite glass composite as a core layer, the tellurite glass composite for increasing a FWHM (full-width at half maximum) of Raman scattering peak centered at 700-800 cm$^{-1}$, comprising an entire composite comprising 25 (mol %) $\leq$TeO$_2$$\leq$90 (mol %), 1 (mol %)$\leq$T$_1$O$_3$$\leq$55 (mol %) or 1 (mol %)$\leq$T$_2$O$_3$$\leq$40 (mol %), 0 (mol %)$\leq$ZnO$\leq$35 (mol %), 0 (mol %)$\leq$M$_2$O$\leq$35 (mol %), and 0 (mol %)$\leq$Bi$_2$O$_3$$\leq$20 (mol %), wherein T$_1$ is a transition metal of Mo, T$_2$ is a transition metal of W, M$_2$O consists of Li$_2$O, Na$_2$O, and K$_2$O, and the amounts of M$_2$O and ZnO are not simultaneously "0".

12. The optical waveguide of claim 11, wherein the entire composite comprises one or more of MoO$_3$, WO$_3$, Ta$_2$O$_5$, PbO, Nb$_2$O$_3$, and Al$_2$O$_3$ by an amount between 0 mol % and 20 mol %.

13. The optical waveguide of claim 11, wherein a composite of oxides excluding Te, Mo, W, Zn, M, or Bi, oxides excluding Ta, Pb, Nb, or Al, and fluorides is added to the entire composite by an amount between 0% and 40%, the oxides and the fluorides excluding rare-earth oxides and rare-earth fluorides.

14. The optical waveguide of claim 11, wherein one or more of rare-earth oxides including $Pr_2O_3$, $Nd_2O_3$, $Sm_2O_3$, $Eu_2O_3$, $Tb_2O_3$, $Dy_2O_3$, $Ho_2O_3$, $Er_2O_3$, $Tm_2O_3$, and $Yb_2O_3$ or fluorides including $PrF_3$, $NdF_3$, $SmF_3$, $EuF_3$, $TbF_3$, $DyF_3$, $HoF_3$, $ErF_3$, $TmF_3$, and $YbF_3$ are added to the entire composite by an amount between 0 mol % and 5 mol %.

15. An optical amplifier using a tellurite glass composite as a gain medium of one of an optical fiber and an optical waveguide and using pump sources having one or two or more wavelengths between 1150 nm and 1500 nm as excitation sources, the tellurite glass composite for increasing a FWHM (full-width at half maximum) of Raman scattering peak centered at 700-800 $cm^{-1}$, comprising an entire composite comprising 25 (mol %)$\leq TeO_2 \leq$90 (mol %), 1 (mol %)$\leq T_1O_3 \leq$55 (mol %) or 1 (mol %)$\leq T_2O_3 \leq$40 (mol %), 0 (mol %)$\leq$ZnO$\leq$35 (mol %), 0 (mol %)$\leq M_2O \leq$35 (mol %), and 0 (mol %)$\leq Bi_2O_3 \leq$20 (mol %), wherein $T_1$ is a transition metal of Mo, $T_2$ is a transition metal of W, $M_2O$ consists of $Li_2O$, $Na_2O$, and $K_2O$, and the amounts of $M_2O$ and ZnO are not simultaneously "0".

16. The optical amplifier of claim 15, wherein the entire composite comprises one or more of $MoO_3$, $WO_3$, $Ta_2O_5$, PbO, $Nb_2O_3$, and $Al_2O_3$ by an amount between 0 mol % and 20 mol %.

17. The optical amplifier of claim 15, wherein a composite of oxides excluding Te, Mo, W, Zn, M, or Bi, oxides excluding Ta, Pb, Nb, or Al, and fluorides is added to the entire composite by an amount between 0% and 40%, the oxides and the fluorides excluding rare-earth oxides and rare-earth fluorides.

18. The optical amplifier of claim 15, wherein one or more of rare-earth oxides including $Pr_2O_3$, $Nd_2O_3$, $Sm_2O_3$, $Eu_2O_3$, $Tb_2O_3$, $Dy_2O_3$, $Ho_2O_3$, $Er_2O_3$, $Tm_2O_3$, and $Yb_2O_3$ or fluorides including $PrF_3$, $NdF_3$, $SmF_3$, $EuF_3$, $TbF_3$, $DyF_3$, $HoF_3$, $ErF_3$, $TmF_3$, and $YbF_3$ are added to the entire composite by an amount between 0 mol % and 5 mol %.

* * * * *